United States Patent [19]

Konrad et al.

[11] 4,449,080
[45] May 15, 1984

[54] ELECTRIC VEHICLE PROTECTION SCHEME

[75] Inventors: Charles E. Konrad, Roanoke; Robert C. Clark, deceased, late of Charlottesville, Va., by Jean B. Clark, executrix

[73] Assignee: General Electric Company, Charlottesville, Va.

[21] Appl. No.: 382,477

[22] Filed: May 27, 1982

[51] Int. Cl.$^3$ .............................................. H02P 5/16
[52] U.S. Cl. .............................. 318/139; 318/345 R; 318/506; 361/90
[58] Field of Search ............... 318/139, 264, 272, 332, 318/345 R, 345 A, 434, 474, 506; 361/33, 90, 91, 92, 88, 86; 307/125, 132 E, 130

[56] References Cited

U.S. PATENT DOCUMENTS

| | | | |
|---|---|---|---|
| 3,818,291 | 6/1974 | Hiroyuki | 318/139 |
| 3,902,105 | 8/1975 | Delaney et al. | 318/139 |
| 3,914,675 | 10/1975 | Konrad | 318/453 |
| 3,973,176 | 8/1976 | Rohsler | 318/139 |
| 4,017,775 | 4/1977 | Artrip | 318/139 |
| 4,025,836 | 5/1977 | Naito et al. | 318/139 |
| 4,081,725 | 3/1978 | Schimdt et al. | 318/139 |
| 4,165,801 | 8/1979 | Watanabe et al. | 361/33 |
| 4,171,510 | 10/1979 | Kiwaki et al. | 318/139 |
| 4,200,832 | 4/1980 | Johansson et al. | 318/139 |
| 4,262,238 | 4/1981 | Schwarz et al. | 318/139 |

*Primary Examiner*—B. Dobeck
*Assistant Examiner*—Arthur G. Evans
*Attorney, Agent, or Firm*—Ormand R. Austin

[57] ABSTRACT

A fault detection and inhibit circuit for a power control unit in an electric traction motor propelled vehicle of the type wherein the power control unit includes a chopper circuit and a bypass contactor for shunting the chopper circuit when its percent conduction exceeds a relatively high value and a main contactor for connecting the chopper circuit and motor to a power source. The circuit assures that neither the main contactor, the bypass contactor nor the chopper circuit are in a shorted condition before permitting the application of power to the system. In the event of a running failure, the circuit prevents restarting until the failed condition has recovered.

3 Claims, 2 Drawing Figures

ELECTRIC VEHICLE PROTECTION SCHEME

BACKGROUND OF THE INVENTION

The present invention is directed to power control systems for electric traction motor propelled vehicles and, more particularly to safety and protection apparatus for use with such systems.

In many electric vehicles, electronic power regulators are used to control the torque, or speed, developed by electric traction motors propelling the vehicle. Typically, the regulator comprises a time-ratio or chopper circuit which varies the power developed by the motors by controlling the percentage of time that the motors are connected to a power source. The chopper circuit may be either a transistor or a thyristor (SCR) circuit. In either case a mechanical bypass switch is generally connected in shunt with the chopper circuit. The bypass switch is closed for high conduction ratio (high current) of the chopper circuit to minimize thermal stress on the solid state components.

The vehicle system also includes a series contactor which may be activated by a key switch for connecting the regulator and motor to the power source.

It is known for the contact tips of the bypass contactor to fail in a closed state, e.g., the tips may be welded together by a sudden current surge at closure. It is also known for the chopper circuit to fail in a shorted condition. If an attempt is made to start a vehicle in which either of these failures exist, large currents are developed in the motors upon closure of the series contactor. Although a series connected DC motor is somewhat protected by the relatively high impedance of the field winding, the armature of a separately excited motor is not so protected. In fact, in an 84 volt system, armature current can quickly jump to over 3000 amperes causing severe damage to the armature.

Of even more concern, however, is the possibility of having the main contactor weld closed due to a failure of the bypass switch or the chopper circuit. This type of failed condition could result in a runaway vehicle.

It is an object of the present invention to provide a protection system for use in a DC electric motor power control system.

It is a further object of the invention to provide a protection system which will detect a failed condition of a power regulator or a bypass contactor and inhibit operation of the control system.

SUMMARY OF THE INVENTION

A fault detection and inhibit circuit is provided for use with a solid-state power control system for a DC electric motor. The power control system is of the type including a switching regulator for regulating power to the motor, a bypass contactor connected in shunt with the regulator and a main contactor for connecting the regulator and motor to a power source. The fault detection circuit includes a voltage divider connected across the power source with an intermediate point connected to the junction between the main and bypass contactors. Prior to energization of the contactors or the regulator, a fault will be indicated by the potential at the intermediate point of the voltage divider going to either a high or a low value. The inhibit circuit responds to the intermediate point voltage and prevents the application of power to the system by inhibiting operation of the main contactor drive circuit.

DESCRIPTION OF THE DRAWINGS

The novel features which are believed to be characteristic of the invention are set forth in the appended claims. The invention itself, however, both as to its advantages and objects thereof may best be understood by reference to the following description taken in conjunction with the accompanying drawing in which:

DETAILED DESCRIPTION

Figure 1:
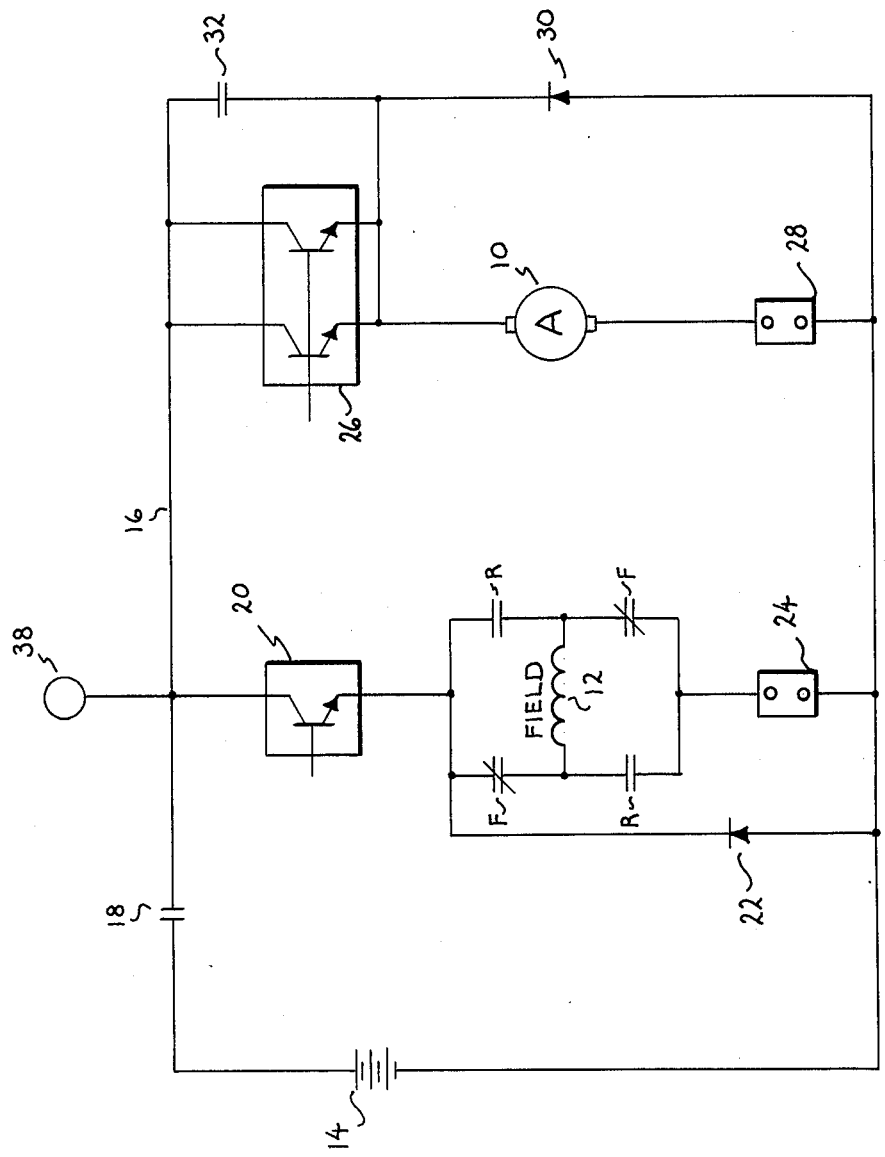
FIG. 1 is a simplified schematic diagram of a DC electric motor power circuit.

Referring now to FIG. 1, there is shown a simplified schematic diagram of a power control or regulator circuit for a separately excited DC electric motor. The DC electric motor includes an armature 10 and a field winding 12. A DC power source, illustrated as a battery 14, provides direct current power to the motor field and armature. A relatively positive terminal of the battery 14 is connected to a DC bus 16 by means of a main contactor 18. The motor field winding 12 is connected in a bridge arrangement by means of a plurality of forward and reverse contact labeled F and R respectively. By opening the F contacts and closing the R contacts, the direction of rotation of the armature 10 can be reversed. The field winding 12 is connected between the power bus 16 and a relatively negative terminal of the battery 14 by means of a current regulator circuit 20. In a preferred embodiment, the current regulator circuit 20 is a transistorized chopper circuit which controls the average current through the field winding 12 by switching between conducting and non-conducting states. A free wheeling diode 22 connected in shunt with the field winding 12 provides a field current path for inductive currents during the non-conducting time intervals of the chopper circuit 20. A current shunt 24 connected in series with the field winding 12 provides an output signal indicative of average field current, which signal is used by a control circuit (not shown), for regulating the conduction time intervals of the chopper circuit 20 to obtain a desired level of field current.

The armature 10 is similarly connected to the power bus 16 by means of a chopper circuit 26. A current shunt 28 is connected between the armature and the power source 14. A free wheeling diode 30 is connected in shunt with the armature 10 to provide a current path for armature current during the non-conduction time of chopper circuit 26. A bypass contactor 32 is connected in parallel with the chopper circuit 26. The bypass contactor 32 is closed when the conduction time ratio of the chopper circuit 26 approaches unity in order to minimize the thermal strain of the chopper circuit at high conduction levels.

In the operation of the power circuit of FIG. 1, a control circuit (not shown) first provides an energizing signal to close the main contactor 18 and thereafter provide gating signals to the chopper circuit 20 and chopper circuit 26 to control the level of current in the armature 10 and field winding 12 in order to achieve a desired level of torque output. The control circuit may be of several types known in the art such as, for example, that shown in U.S. Pat. No. 3,843,912 issued Oct. 22, 1972, and assigned to General Electric Company. A control circuit specifically adapted for a separately excited motor is shown in applicant's co-pending application serial number 379,867 filed May 19, 1982, and assigned to General Electric Company. As the motor armature 10 begins to rotate, its counter electromotive force builds up and the conduction period for the chopper circuit 26 increases in order to force the desired level of current for the desired magnitude of torque. When the conduction time ratio of chopper circuit 26 approaches 100 percent, the bypass contactor 32 is closed thereby connecting the armature 10 directly across the battery 14. If the contactor 32 should weld, subsequent efforts by the control circuit to vary the torque output of the motor will be unsuccessful since the chopper 26, although responding to the control circuit is unable to modulate the current to armature 10. In such situations a fault detector circuit (not shown) normally monitors the combination of the chopper 26 and contactor 32 and opens the main contactor 18 if a malfunction in the chopper 26 or contactor 32 is detected. Such a fault detection circuit is shown in U.S. Pat. No. 3,914,675 issued Oct. 21, 1975, and assigned to General Electric Company.

Once the control circuit has shut down because of a fault detection, the operator will sometimes attempt to move the vehicle to a repair station by repetitively opening and closing the main contactor 18. As described before, such action can result in current in excess of 3000 amperes being applied to the motor armature. Furthermore, such high currents may weld the contacts of the contactor 18, thereby placing the armature directly across the battery without any type of protection.

In addition to the possibility of failure of the contactor 32, the chopper circuit 20 may also fail in a shorted condition. Although the latter failure is not as serious as the failure of chopper circuit 26, it does prevent control of the motor since it will result in full field current which will limit the maximum vehicle speed to less than half speed, and may also result in excessive field temperatures within thirty minutes. It is also possible for the main contactor 18 to weld in a closed condition even though the regulator circuits 20 and 26 and the contactor 32 are still operational. Clearly it would be inadvisable to operate the system under such conditions since any subsequent failure of either of the regulator circuits 20 or 26 or bypass contactor 32 could result in a runaway situation with attendant damage to the electronics and the motor in the system.

Figure 2:
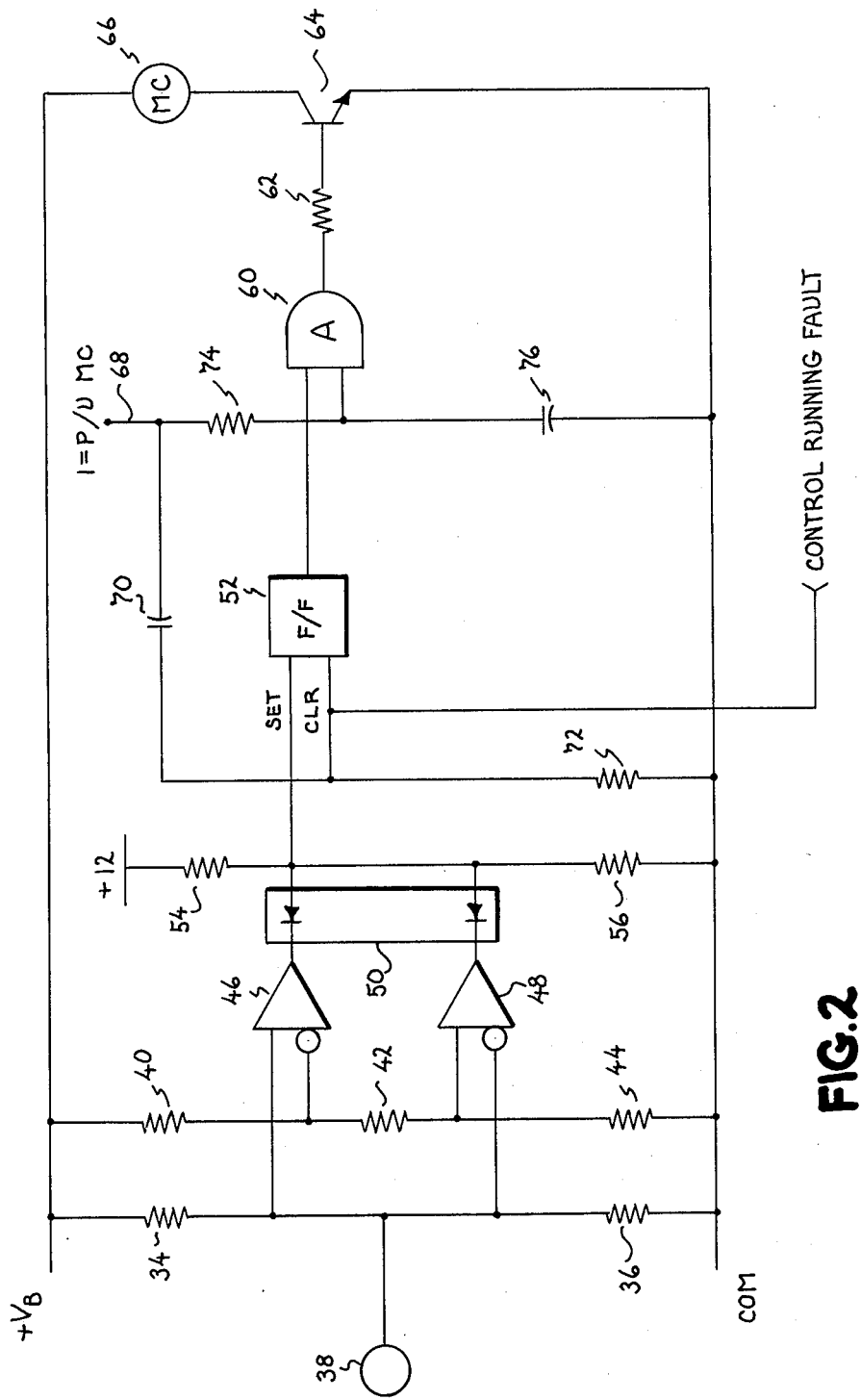
FIG. 2 is a schematic diagram of the inventive safety and protection circuit for the power circuit of FIG. 1.

Referring now to FIG. 2, there is shown a fault detection and inhibit circuit constructed in accordance with the present invention. A first voltage divider comprising serially connected resistors 34 and 36 is connected across the battery 14. In a preferred embodiment the resistors 34 and 36 have the same resistance such that a junction 38 intermediate the two resistors is at approximately one-half of battery voltage. The junction 38 is connected to a point on bus 16 between contactor 18 and contactor 32. Consequently, the resistor 34 is connected in parallel with the contactor 18 and the resistor 36 is connected in parallel with motor armature 10 and contactor 32. It will, therefore, be appreciated that if the contactor 18 is welded closed, the voltage at junction 38 will rise to battery voltage. Alternatively, if the contactor 32 is welded closed, the voltage at junction 38 will be at essentially battery negative or ground potential. The junction 38 will also be at or near ground potential if the regulator 20 or the regulator 26 is in a failed short condition.

A second voltage divider comprising the serially connected resistors 40, 42 and 44 is connected across the battery 14. A junction intermediate resistor 40 and 42 is connected to an inverting input terminal of a voltage comparator 46. A junction intermediate the resistor 42 and 44 is connected to a non-inverting input terminal of a comparator 48. A non-inverting input terminal of comparator 46 is connected to the junction 38 as is an inverting input terminal of comparator 48. An output terminal of comparator 46 is connected to a first input terminal of a diode OR gate 50. A second input terminal of OR gate 50 is connected to an output terminal of comparator 48. An output terminal of OR gate 50 is connected to a SET input terminal of a latching flip flop 52. A pullup resistor 54 connects the output terminal of OR gate 50 to a positive voltage source and a bleeder resistor 56 connects that output terminal to a common or ground terminal.

An output terminal of flip flop 52 is connected to a first input terminal of an AND gate 60. An output terminal of AND gate 60 is connected through a resistor 62 to a base terminal of a transistor current driver 64. An actuation coil 66 for the main contactor 18 is connected between a collector terminal of transistor driver 64 and the positive voltage terminal of battery 14. An emitter terminal of transistor driver 64 is connected to the negative terminal of battery 14.

An input terminal 68 is connected to receive a pickup command from the control circuit (not shown) of the vehicle. As mentioned previously, the pickup command may be simply the turning of a key switch. The pickup command is propagated through a differentiation circuit comprising a capacitor 70 and serially connected resistor 72, with one terminal of resistor 72 being connected to the battery negative terminal. The junction intermediate the capacitor 70 and the resistor 72 is connected to a CLEAR input terminal (CLR) of the latching flip flop 52. The pickup command at terminal 68 is also connected through an integrating circuit comprising a series combination of a resistor 74 and capacitor 76, one terminal of the capacitor 76 being connected to battery common. The junction intermediate resistor 74 and capacitor 76 is connected to a second input terminal of the AND gate 60.

In operation, if the voltage at junction 38 is at the mid point of battery voltage thereby indicating that neither contactor 18 nor contactor 32 nor either of the chopper regulator circuits 20 or 26 has failed, the comparators are held in a state where both their output terminal voltages are at logic one levels. Accordingly, the output of the logic OR circuit 50 is at a logic one level and that logic one level signal is applied to the set input terminal of flip flop 52. Subsequently, when a pickup command is applied to terminal 68, a clear signal appears immediately on the CLEAR terminal of flip flop 52 forcing its output signal to become a logic one level. After a short time delay determined by the relative values of resistor 74 and capacitor 76, the pickup command appears as a logic one level at the second input terminal of AND gate 60. With both input terminals now at a logic one level, a signal is provided from AND gate 60 to the base terminal of transistor driver 64 forcing it into conduction and thereby allowing the main contactor to be picked up. The differentiation circuit allows the CLEAR signal to be present for only a short time interval, e.g., 100 milliseconds. The integrating circuit, after approximately the same time interval, provides a latching function to hold the main contactor energized.

In the event that either the main contactor, the bypass contactor, chopper circuit 20 or chopper circuit 26 is in a failed condition, the voltage at junction 38 will either rise above or drop below its midpoint value. In either case, one of the comparators 46 or 48 will detect the deviation from the midpoint voltage and generate a logic zero output signal on its respective output terminal. The logic zero signal will be propagated through the OR gate 50 and place a logic zero signal on the SET input terminal of flip flop 52. When the pickup command is thereafter applied to terminal 68, the output signal developed by flip flop 52 will become a logic zero. That signal will thus inhibit operation of AND gate 60 thereby preventing the transistor driver 64 from going into conduction and inhibiting the operation of the main contactor 18. The values of the resistors 40, 42 and 44 are selected to provide an appropriate range of voltages about battery mid-point to prevent inadvertent inhibit functions. Values of 22 K ohms for resistors 40 and 44 and a value of 10 K ohms for resistor 42 provides a range from 40 percent to 60 percent of battery voltage.

In the event of a failure of either the chopper circuit or the bypass contactor 32 during normal running conditions, the aforementioned fault detection circuit will provide an output signal to force the main contactor 18 to drop out. That output signal may be applied to the CLEAR input terminal of flip flop 52, thereby immediately forcing its output to go to a logic zero. The logic zero will occur at the output of flip flop 52 since during operation with the contactor 18 closed, the output signal developed by the comparator 46 or the comparator 48 will be a logic zero, thereby applying a logic zero to the SET input terminal of flip flop 52. Thereafter, the safety circuit will detect that either the contactors have been welded shut or that the regulator circuits have failed in a shorted condition and will inhibit any further actuation of the main contactor 18.

Although the invention has been shown in what is presently considered to be a preferred embodiment, it will be apparent that many modifications and changes may be made in the system without departing from the true spirit and scope of the invention. Accordingly, it is intended that the invention not be limited by the detailed description contained herein but that it be interpreted within the full spirit and scope of the appended claims.

We claim:

1. A fault detection and inhibit circuit for a power control unit in an electric traction motor propelled vehicle, the control unit including a chopper circuit for regulating power to the motor and a bypass contactor for shunting the chopper circuit when the percent conduction time of the chopper circuit exceeds a predetermined value, and a main contactor for connecting the motor, the chopper circuit and a power source in a series current path, comprising;
   (a) a first voltage divider connected in parallel with the power source;
   (b) means for connecting an intermediate point of said first voltage divider to a point intermediate the main contactor and the bypass contactor;
   (c) means for comparing the voltage at said intermediate point of said first voltage divider to a predetermined range of voltage values; and
   (d) means for inhibiting the operation of the main contactor when said intermediate point voltage is outside said predetermined range of voltage values.

2. The circuit of claim 1 wherein:
   said traction motor is a separately excited motor having parallel connected armature and field windings;
   said chopper circuit is connected in series with the armature winding; and
   a current regulator, for regulating field winding current, is connected in series with the field winding between the point intermediate the main contactor and the bypass contactor and a terminal of the power source.

3. The circuit of claim 1 or 2 wherein said comparing means comprises:
   (a) a second voltage divider connected across the power source;
   (b) a first voltage comparator having a first input terminal connected to a relatively high voltage top point on said second voltage divider and having a second input terminal connected to said intermediate point on said first voltage divider, said first comparator providing a set signal when said intermediate point voltage exceeds the voltage at said first input terminal;
   (c) a second voltage comparator having a first input terminal connected to a relatively low voltage top point on said second voltage divider and having a second input terminal connected to said intermediate point on said first voltage divider, said second comparator providing a set signal when said intermediate point voltage is less than the voltage at said first input terminal; and
   (d) means for coupling said set signal from said first and said second comparators to said inhibiting means.

* * * * *